United States Patent
Liang et al.

(10) Patent No.: US 9,256,373 B1
(45) Date of Patent: Feb. 9, 2016

(54) INVULNERABLE DATA MOVEMENT FOR FILE SYSTEM UPGRADE

(71) Applicant: EMC Corporation, Hopkinton, MA (US)

(72) Inventors: Shuang Liang, Sunnyvale, CA (US); Mahesh Kamat, Milpitas, CA (US)

(73) Assignee: EMC Corporation, Hopkinton, MA (US)

( * ) Notice: Subject to any disclaimer, the term of this patent is extended or adjusted under 35 U.S.C. 154(b) by 88 days.

(21) Appl. No.: 14/281,855

(22) Filed: May 19, 2014

(51) Int. Cl.
*G06F 12/02* (2006.01)
*G06F 3/06* (2006.01)

(52) U.S. Cl.
CPC .......... *G06F 3/0619* (2013.01); *G06F 3/0647* (2013.01); *G06F 3/0689* (2013.01)

(58) Field of Classification Search
CPC .... G06F 3/0619; G06F 3/0647; G06F 3/0689
USPC .......... 711/114, 154, 156, 203; 707/809, 810
See application file for complete search history.

(56) References Cited

U.S. PATENT DOCUMENTS

| | | | | |
|---|---|---|---|---|
| 6,952,794 B2* | 10/2005 | Lu | ................ | G06F 3/0605 711/114 |
| 7,260,696 B2* | 8/2007 | Arakawa | ................ | G06F 3/0605 707/999.01 |
| 7,536,505 B2* | 5/2009 | Takakuwa | ................ | G06F 3/0613 711/114 |
| 7,730,277 B1* | 6/2010 | Prakash | ................ | G06F 3/0619 711/159 |
| 7,769,948 B2* | 8/2010 | Byrne | ................ | G06F 11/1076 711/114 |
| 8,620,970 B2* | 12/2013 | English | ................ | G06F 17/30076 707/803 |
| 2005/0216665 A1* | 9/2005 | Takakuwa | ................ | G06F 3/0613 711/114 |
| 2010/0095164 A1* | 4/2010 | Kamei | ................ | G06F 17/30221 714/48 |
| 2011/0225359 A1* | 9/2011 | Kulkarni | ................ | G06F 3/0607 711/114 |
| 2013/0019062 A1* | 1/2013 | Bennett | ................ | G06F 3/0614 711/114 |
| 2013/0282980 A1* | 10/2013 | Bennett | ................ | G06F 3/0689 711/114 |
| 2014/0108468 A1* | 4/2014 | English | ................ | G06F 17/30076 707/810 |
| 2014/0344507 A1* | 11/2014 | Piggin | ................ | G06F 12/0246 711/103 |
| 2014/0365726 A1* | 12/2014 | Bennett | ................ | G06F 3/0689 711/114 |

* cited by examiner

*Primary Examiner* — Stephen Elmore
(74) *Attorney, Agent, or Firm* — Barry N. Young

(57) ABSTRACT

A single virtual storage device file system that abstracts multiple RAID groups of physical storage devices into one virtual device and one first blockset having a plurality of data blocks in a contiguous linear address space is converted into a multiple virtual device file system that abstracts the multiple RAID groups of physical storage devices as separate multiple virtual storage devices each having a separate second blockset and address space, by migrating data in allocated blocks at boundaries of the physical storage device groups to free blocks, partitioning the first blockset at the boundaries into the multiple second blocksets, updating the block metadata of each block, and rebuilding the file system using the block metadata to generate second blockset metadata.

17 Claims, 6 Drawing Sheets

INVULNERABLE DATA MOVEMENT FOR FILE SYSTEM UPGRADE

BACKGROUND

This invention relates generally to file system conversion, and more particularly to a file system upgrade in a data integrity storage system.

Primary storage systems are generally optimized for performance and system availability, not for data invulnerability; they make design tradeoffs that favor speed over data recoverability. Even most backup appliances that are intended for data backup and archiving inherit the design philosophies of their primary storage predecessors. They are typically built using similar commodity disks and other components, and are not designed robustly to support long term data backup and data invulnerability. Most backup systems tend to be optimized for performance rather than data invulnerability. They assume that data is stored correctly to begin with. They do not have file systems that perform careful data writes, such as, for example, reading back data written to disk to verify the data was written correctly as this would impact speed and performance.

Storage systems such as used for backup and archive typically have a file system that organizes a plurality of disks into a logical disk groups from which RAID arrays are created. The physical disks groups are contained in enclosures referred to as shelves. These systems generally concatenate disk groups into a storage layer comprising a logical, contiguous, linear address space partitioned into one set of fixed sized blocks as a blockset over which the file system is formatted. Such a file system is referred to herein as a single virtual storage device file system because the file system abstracts multiple physical disks into one virtual storage device. An ordered list of disk groups, their sizes and their unique offsets in the linear address space is maintained, and the file system allocates fixed-size data blocks to users to store user data and metadata. Each disk and disk group has an embedded offset that is associated with its location in the address space. Accordingly, removal of any of the fixed-size blocks of the linear address space would result in "holes" (missing blocks) in the file system address space. Likewise, removal of a shelf would also result in holes. Neither the file system nor the RAID controllers can handle such holes, and the system cannot function with them. Thus, it is very difficult to remove or replace a shelf. There is no straightforward way of migrating user data and metadata off of a shelf and onto a new one without replicating all data to a replica system, destroying and re-creating the file system without the shelf that is removed, and replicating all of the data back onto the remaining disks. This is a manual, slow and expensive process, and one that risks data loss and corruption. Accordingly, it is difficult to upgrade such backup systems.

It is desirable to provide systems and methods that address the foregoing problems of upgrading data backup and recovery systems, while providing for data invulnerability and recoverability. It is to these ends that the present invention is directed.

DESCRIPTION OF PREFERRED EMBODIMENTS

The invention is particularly well adapted to converting and upgrading a single virtual storage device file system of a data storage system while insuring data invulnerability, and will be described in that context. In particular, the invention will be described in connection with upgrading a file system in which a single virtual storage layer architecture which abstracts groups of data storage disks in RAID arrays as a single virtual storage device in a logical contiguous linear address space is converted to a multiple virtual storage device file system. As will be appreciated, however, this is illustrative of only one utility of the invention, and that the invention has greater utility and may be used for other file system upgrades and with other types of systems.

Figure 1:
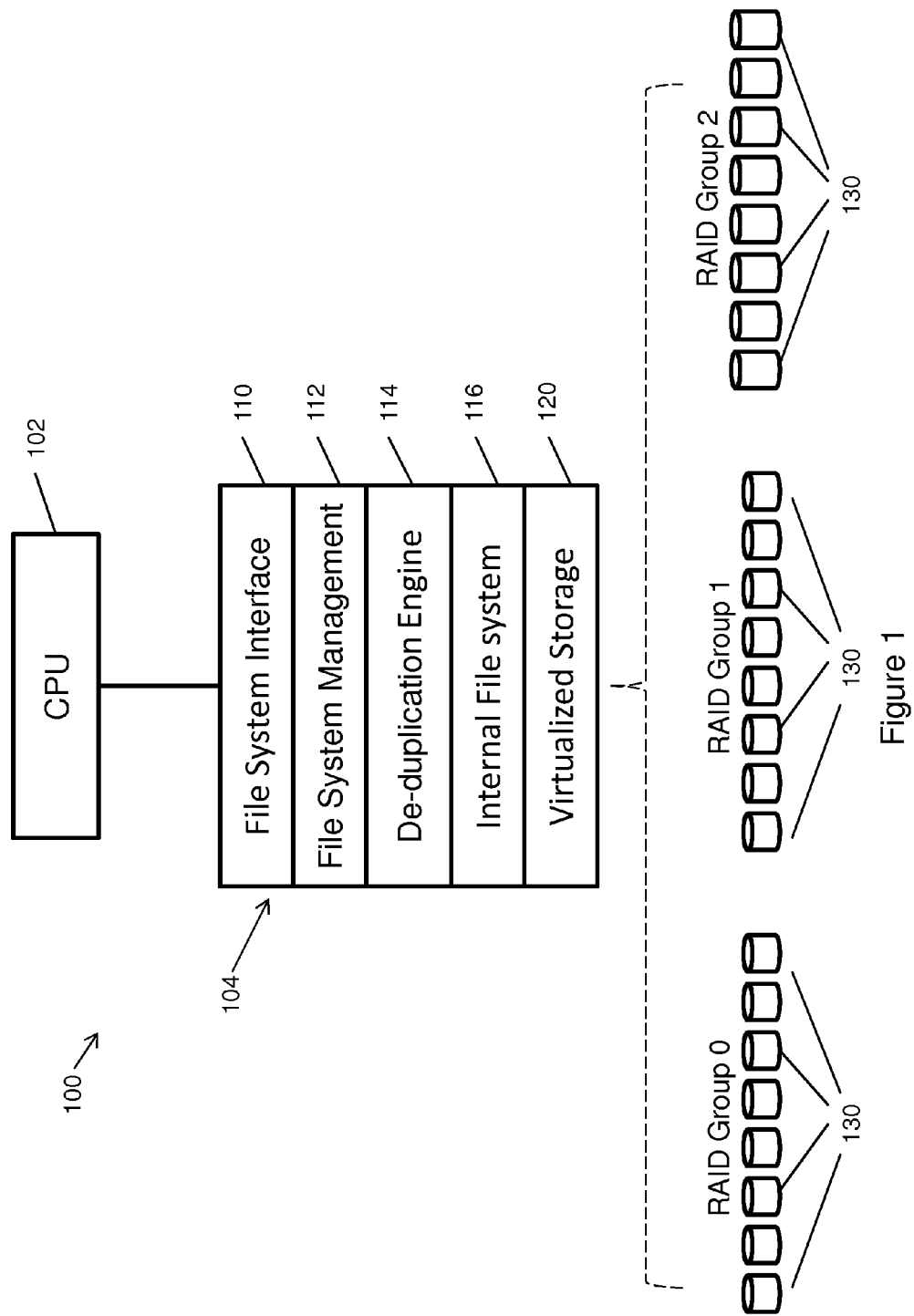
FIG. 1 is a diagrammatic view of a single virtual storage device file system architecture of the type with which the invention may be employed.

FIG. 1 is a high level overview of a storage system and file system architecture 100 of the type that the invention may be used to upgrade. As shown a CPU 102 may comprise a memory 104 that embodies data structures comprising software that affords a file system interface 110 by which a user of the system accesses the file system, and a file system management structure 112 that translates file system accesses from the file system interface into appropriate commands and corresponding filenames in the file system namespace. Memory 104 may also include other types of memory such as main system memory comprising non-transitory machine readable media embodying executable instructions for controlling the operations of the CPU, and may also include non-volatile RAM. The data structures may further provide software comprising a data de-duplication engine 114 which performs a known type of intelligent data compression that that eliminates copies of repeating data to improve utilization of the storage system resources. The data structures further comprise software that provides an internal file system 116 and a virtualized storage layer 120 comprising a single virtual storage device for the system. As will be described in more detail, the internal file system defines the internal file structure of the system including the numbers and sizes of data blocks arranged as a single blockset (blkset), and includes metadata that identifies the locations of data blocks in virtualized storage and the corresponding physical locations of the data on storage devices. The virtualized storage 120 defined by the internal file system in the example shown abstracts a plurality of physical disks 130 in a plurality of RAID groups, Group 0, Group 1 and Group 2, into a single storage layer as one logical, i.e., virtual, storage device mapped to a logical contiguous linear address space managed by the internal file system 116. All data in the storage system is accessed from the physical disks via the virtualized storage using the metadata in the internal file system.

Physically, each RAID group comprises an enclosure, referred to as a shelf, that houses the physical disks and controllers that form that RAID group. The disk controllers include software that calculates parity checksums and controls the actual striping of data and parity across the disks of the RAID group. In an embodiment, there may be fourteen disks per each RAID group, twelve for data and two for parity, arranged as a RAID 6 level storage group. This allows recovery of data upon the simultaneous failure of two disks. In one embodiment the physical storage disks maybe hard rotating disk drives, and in another embodiment the disks may be solid state disks.

Figure 2:
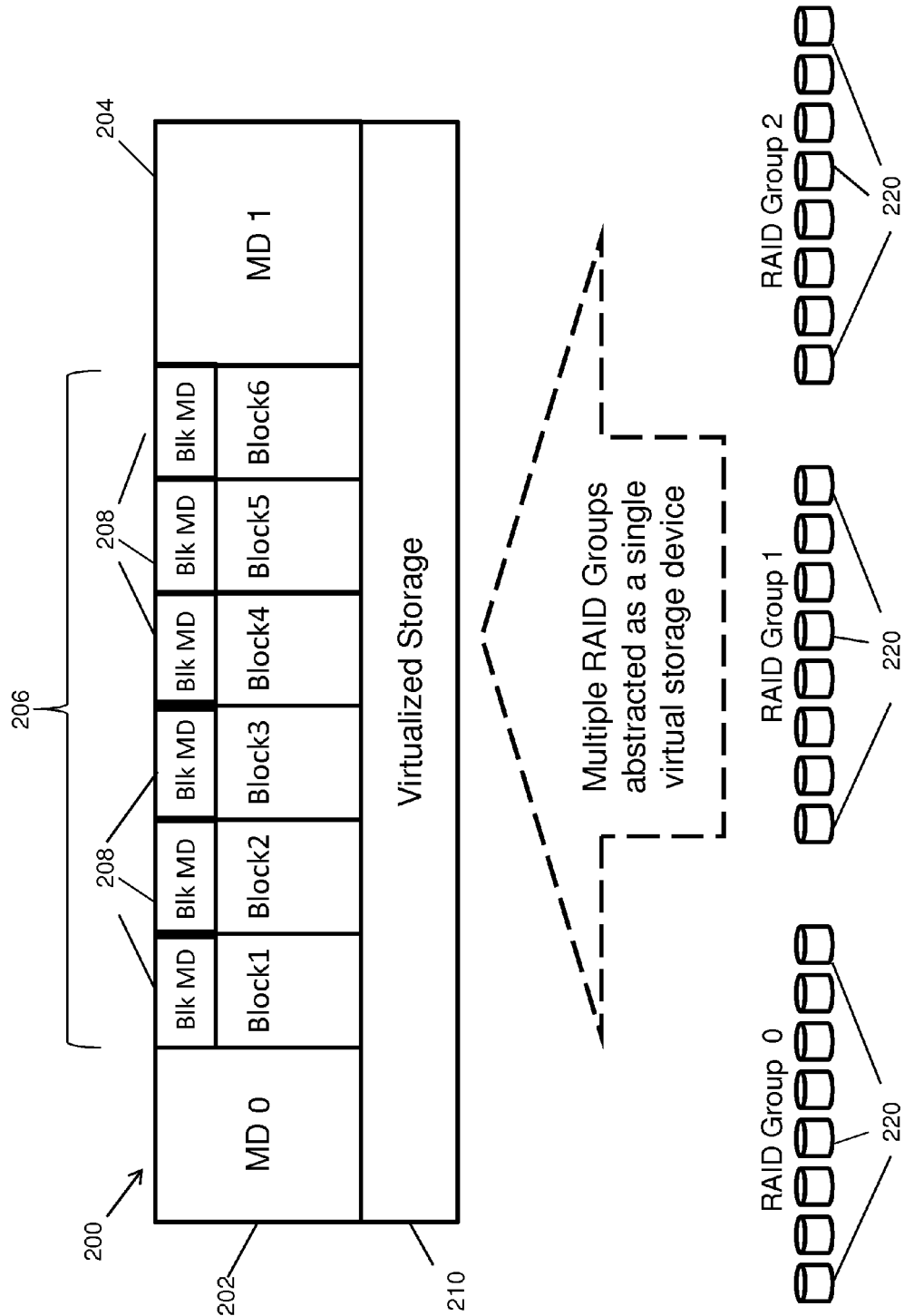
FIG. 2 is a diagrammatic view of the internal file system and virtualized storage of the system of FIG. 1.

FIG. 2 illustrates diagrammatically the internal file system architecture of the system of FIG. 1. As shown, the file system comprises one blockset 200 comprising a blockset header 202 containing first metadata MD 0, a blockset descriptor table (D-table) trailer 204 containing second metadata MD 1, and a plurality of data blocks, 206, Block1-Block6 organized as one logical virtual storage device in a virtualized storage layer 210 that comprises one linear contiguous address space. The blockset 200 corresponds to the virtualized storage layer and device. A plurality of RAID Groups, 220, (RAID Group 0-RAID Group 2) are abstracted into the single virtual storage layer/device and are managed by the file system. Each block 206 has a block header 208 containing block metadata (Blk MD) that is unique to that block. The block metadata may comprise, among other things, for instance, a block identifier, the identifier and name of a file to which the block belongs, a checksum for the block data payload, and an offset in the virtual device address space of the blockset where the block is written and the block length. A storage management system may translate this offset to a physical location in a physical storage device (disk).

The blockset header 202 metadata comprises global blockset metadata, that may comprise, for instance, among other things, an offset in the virtual device of the header, the length of the header, a checksum of the header payload, the number of blocks in the blockset, the number of free blocks, the block size, the size of each entry in the descriptor table 204, the file system name and identifier, and an internal file system filetable that maps a file identifier (fileid) to the filename.

The metadata in descriptor table (D-table) 204 in contrast may include metadata comprising an index of physical blocks and the mapping for each block. This may include for each block in the blockset, for instance, its offset in the virtual device, its length, a checksum of its payload, and an array that represents for each block in the blockset its allocation state (free or allocated), the identifier (fileid) of the file to which it belongs, and a block ID of the block. While FIG. 2 may show only six data blocks 206, it will be appreciated that, in practice, there may be thousand of blocks, all of which are managed by the single virtual device file system.

Because the internal file system abstracts all RAID groups and disks as a single storage device, a RAID group shelf cannot be easily replaced in the event of a disk failure, as indicated above, nor can the system be easily expanded to add disks for increased storage capacity. If a disk or a shelf is removed, the file system would not function. In the event of a disk shelf failure, the data would have to be migrated to a new disk shelf, the system would have to be shut down, the defective disk or shelf replaced with the new disk or shelf, and the file system rebuilt. This is a time consuming and complex process.

The invention addresses these problems, as will be described, by upgrading a single virtual device file system that abstracts multiple physical storage devices as one virtual storage device in a logical contiguous linear address space with a multiple storage device file system that abstracts multiple physical storage devices as multiple virtual storage devices, each having a separate logical address space. Each of the multiple physical storage devices may corresponds to a shelf containing a plurality of disks forming a disk group corresponding to one RAID Group, and each may be abstracted as a virtual storage device partitioned into a plurality of data blocks forming a blockset in its separate independent logical address space that corresponds to the address space boundaries of the one physical disk group corresponding to the RAID Group. If one or more disks of a shelf fail, either the disks or the entire shelf itself can be easily replaced. Moreover, the storage capacity can be easily expanded, as desired, by increasing the capacity of the disks on the new shelf, or by merely adding new shelves. Each block of a blockset has a block header that includes metadata similar to that described above that is unique to that block. Each new virtual storage device comprises one blockset that is partitioned as appropriate into new data blocks, each with its own block metadata. The blockset of each virtual device has header and descriptor table metadata similar to that described above. The file system metadata may be built or updated based upon the metadata of each block and blockset. The size of each blockset depends upon the sizes of the physical storage devices, e.g., disk drives, used. If, for example, 2-3 TB drives are used, the blockset size will be 24-36 TB.

Figure 3:
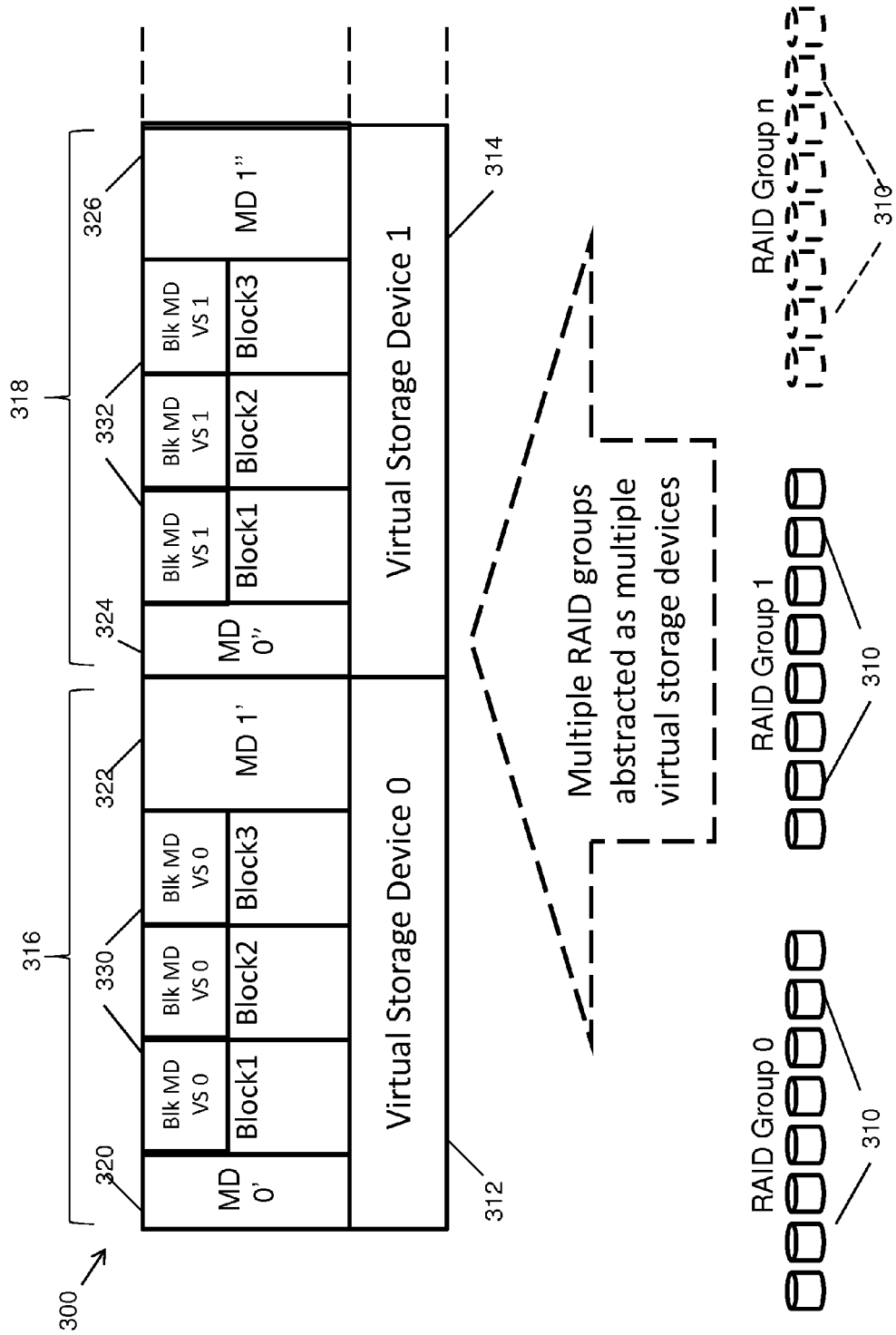
FIG. 3 is a diagrammatic view of an upgraded internal file system and virtual storage in accordance with the invention.

FIG. 3 illustrates an internal file system 300 for multiple virtual storage devices into which the single virtual device internal file system 200 of FIG. 2 may be converted in accordance with the invention. As shown, multiple RAID groups 310 (RAID Group 0, RAID Group 1, . . . RAID Group n) may be abstracted as corresponding multiple virtual storage devices 312, 314, . . . (Virtual Storage Device 0, Virtual Storage Device 1, . . . ), each having a corresponding separate blockset 316, 318, . . . Multiple virtual device internal file system 300 may comprise hundreds of blocksets corresponding to hundreds of virtual storage devices. Blockset 316 for Device 0 abstracts RAID Group 0 and has a header 320 containing metadata MD 0', and a descriptor table (D-table) trailer 322 containing metadata MD 1'; and blockset 318 has a header 324 containing metadata MD 0" and a descriptor table (D-table) trailer 326 containing metadata MD 1". For purposes of illustration, each blockset 316, 318 for corresponding virtual storage devices 312, 314 is shown in the figure as having only three blocks (Block1-Block3), each block having a header 330 or 332 containing block metadata MD for the block applicable to respective virtual storage devices 312, 314 (Device 0, Device 1). Although only three blocks are shown for each blockset, it will be appreciated, however, that in practice, each blockset may comprise thousands of blocks.

The blockset header 320, 324 metadata and blockset D-table 322, 326 metadata of the blocksets 316 and 318 may be similar to that described above in connection with FIG. 2 for blockset 200. It is used, in part, to index and map each blockset to a virtual storage device and, in turn, to a physical RAID Group storage device. Similarly, the block metadata of the blocks 330, 332 may be similar to the block metadata 226 described in connection with FIG. 2. It is used, in part, to index and map each block within the logical address space of a blockset and to a physical RAID Group storage device. The metadata of both the blocksets and the data blocks additionally includes checksum information for error detection.

Figure 4:
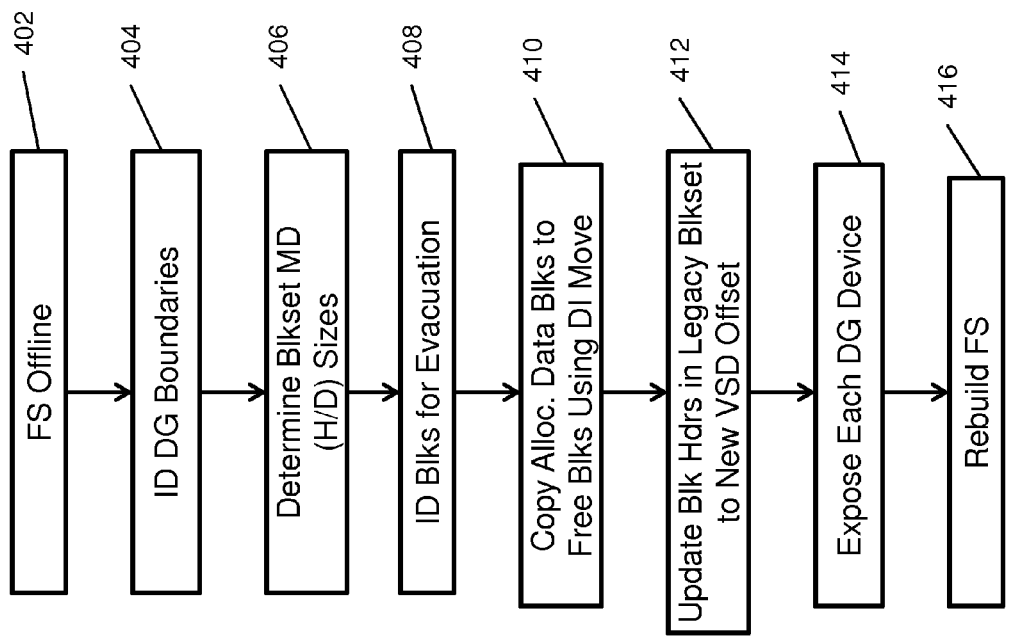
FIG. 4 illustrates an embodiment of a file system upgrade process in accordance with the invention.
Figure 5:
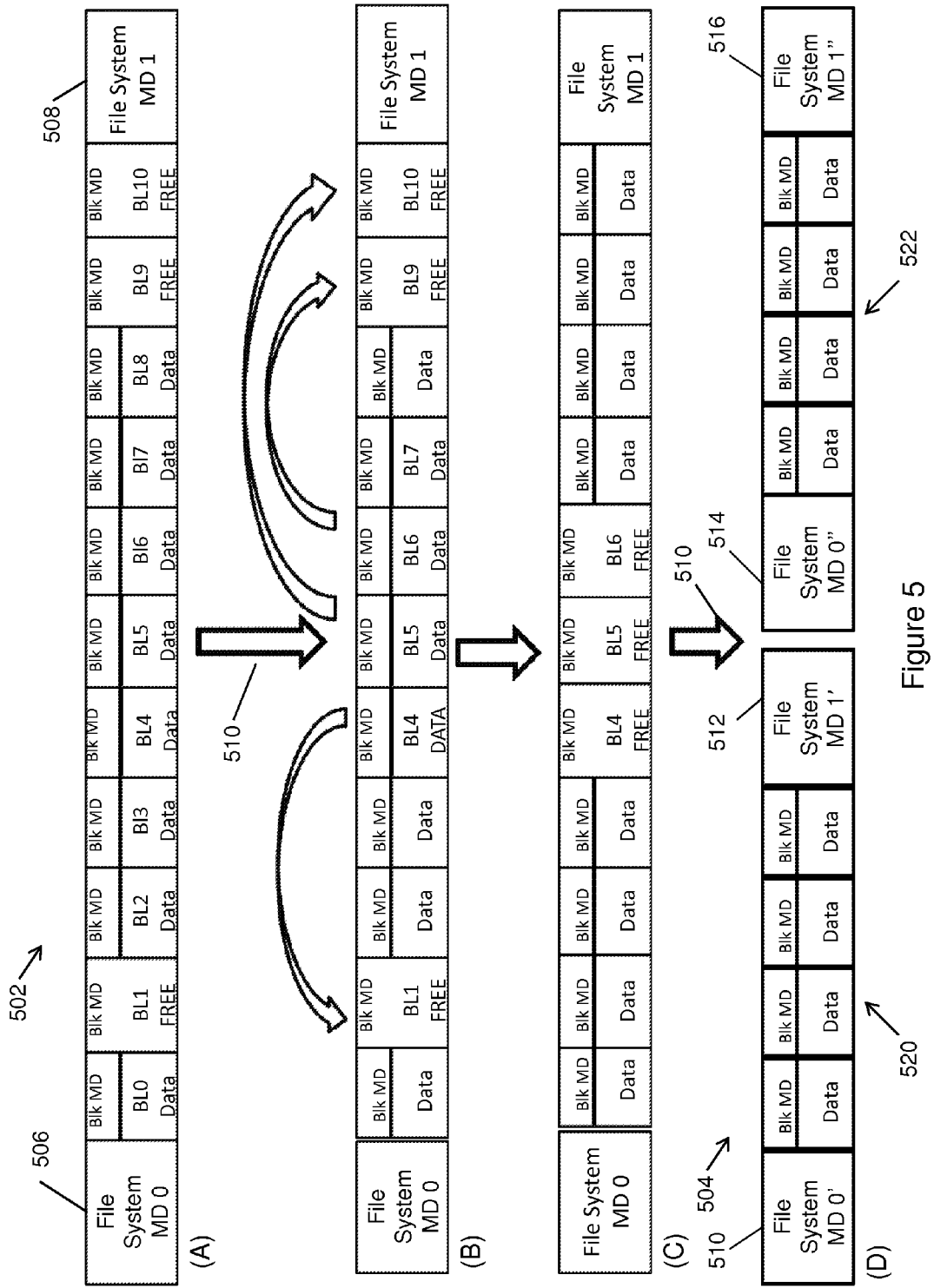
FIG. 5 is a diagrammatic view illustrating an invulnerable data movement for the file system upgrade process of FIG. 4.

FIGS. 4 and 5 together illustrate a process in accordance with the invention for invulnerable data movement and file system upgrade from a legacy single virtual storage device file system to a multiple storage device file system. The process, as will be described, involves both data movement and metadata conversion, and is executed using an invulnerable data movement process so as to enable survival of a system crash at any point in the upgrade process as well as other data corruptions that may be encountered.

The file system upgrade process will be described in the context of upgrading a file system such as illustrated in FIG. 2 to a file system of the type illustrated in FIG. 3. As will be described in more detail, the process involves several phases. A first phase is invulnerable data movement to make space for new data and metadata, and a second involves a metadata conversion phase to transform the file system to the new format.

As a preliminary overview, in the invulnerable data movement phase, the user data portion of each data block may be first moved to a new block, the metadata portion of the data block may be moved and/or upgraded for the new block, and finally the file system metadata may be upgraded. The source data on disk is protected by using RAID reads that verify the P/Q RAID 6 checksum and recover any corruption, if needed. The data migration from its source to its destination may be protected by a read-verify-after-write procedure, where the data is first read and written into nonvolatile system buffer memory from which it is written onto system disks. The disk data may be read back and compared to the data in buffer memory to verify that it is correct. If the read verify procedure detects corruption, data can be recovered by retrying the data movement. If any crashes occur during this movement, the file system can restart in its previous single virtual device format and any required data movement can be redone. If there is any corruption in the file system metadata after a crash, the file system can rebuild the metadata from the copy residing in the data blocks, and restart the process.

In the metadata conversion phase, the metadata portion of each data block is updated. If any corruption is detected in the old format, data can be recovered from the file system metadata. If any corruption is detected in the converted metadata, the metadata can be recovered by retrying. If there is a crash, the file system may be restarted in the old format, the metadata portion of each data block read, and the process restarted from where it was interrupted. The file system metadata may be updated based on the new metadata of each data block. If a crashes occurs during this process, the upgrade process may be restarted. The file system metadata only needs to be upgraded once at the end of rebuild. If there is any metadata corruption in a data block, the new block metadata may be derived from the file system metadata in the old format.

In more detail, FIG. 4 illustrates an embodiment of an upgrade process, and FIG. 5 illustrates an embodiment of the upgrade from a single device file system 502 such as shown in FIG. 2 to a multiple device file system 504 such as shown in FIG. 3, where each virtual storage device corresponds to a single RAID disk group and has a separate blockset and its own independent logical address space. As shown in FIG. 5 at (A), the single device file system may comprise a blockset 502 comprising eleven data blocks BL0-BL10, of which blocks BL1, BL9 and BL10 are "Free" (unallocated) and the remaining blocks are allocated (have data), as indicated in the figure. All blocks have block metadata ("Blk MD"). The blockset 502 also has a header 506 containing file system blockset metadata MD 0 and a D-table 508 containing blockset metadata MD 1. Thus, there are three copies of block metadata in the file system that can be used for restoring metadata in the event of a crash or data corruption, i.e., one set in each block, and one set each in the header and the D-table. The block and blockset metadata may be as previously described.

Referring to FIG. 4, an upgrade process in accordance with the invention begins at 402 where the file system is taken offline. This is to prevent any attempt to store data during the upgrade process. At 404, the RAID interface may be used to identify (ID) the RAID disk group (DG) address space boundaries to enable partitioning the blockset onto separate blocksets corresponding to the different RAID groups. For purposes of illustration, it is assumed that the first disk group extends from the header 502 to a boundary 510 within data block BL5, as indicated by the arrow in FIG. 5. This boundary 510 is where the blockset 502 should be split to form the first blockset for a first virtual storage device corresponding to the first RAID disk group. At step 406, based upon the RAID disk group size, the sizes of the metadata header and D-table trailer for the new first blockset to be formed may be determined, and the sizes of the metadata for the header and D-table of a following second blockset corresponding to a second disk group (second RAID disk group) can be determined. At 408 the allocated data blocks of the original blockset 502 adjacent to the first disk group boundary 510 that need to be evacuated to accommodate the header and D-table metadata of the new first and second blocksets are identified. In the present example, it is assumed that these are original blocks BL4, BL5 and BL6, as shown in FIG. 5 at (B).

Figure 6:
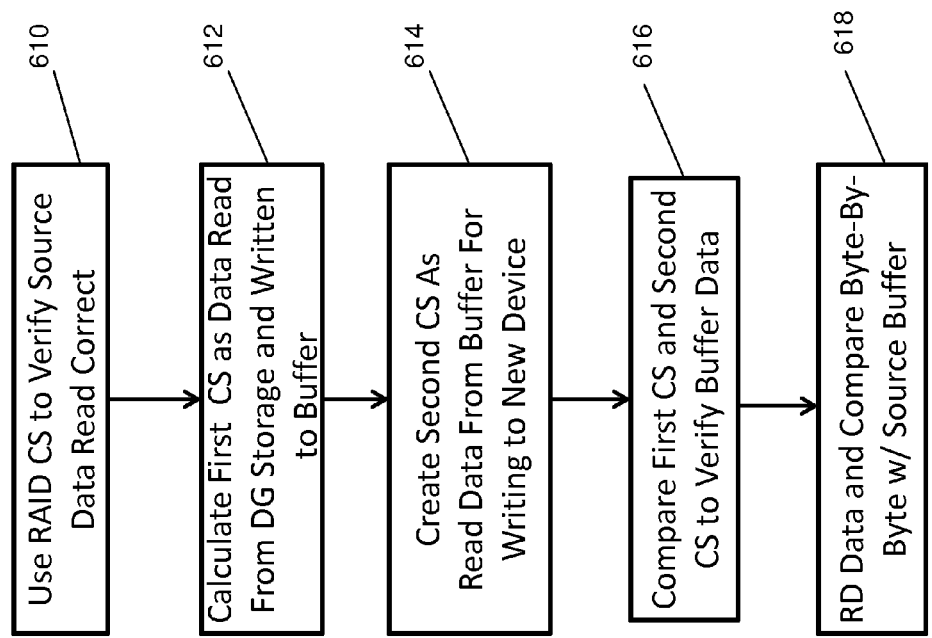
FIG. 6 illustrates details of an embodiment of an invulnerable data movement process of FIG. 5.

At 410 (FIG. 4), the data in the identified allocated data blocks (BL4-BL6) are migrated to free data blocks using the invulnerable data movement described above and as will be described more fully in connection with FIG. 6. As shown by the arrows in FIG. 5 at (B), data block BL4 may be moved to free data block BL1, and data blocks BL5 and BL6 may be moved to free blocks BL9 and BL10, respectively. As shown in FIG. 5 at (C), this results in free blocks BL4-BL6 adjacent to the disk group boundary 510, which in the example of FIG. 5 provide the space required for a descriptor table 512 and a header 514 for two new blocksets 520 and 522, as indicated at (D) in FIG. 5.

If any corruption is encountered in a destination block in step 410, the copy may be redone since the source data is protected by the RAID parity on disk and a checksum in the memory buffer. This is illustrated in FIG. 6 which shows the invulnerable data migration process in more detail. As shown in FIG. 6, at 610 source data read from disk is verified as being correct using the RAID parity checksum (CS). At 612, as the data is read from disk and written to system buffer memory (non-volatile RAM), a first checksum, e.g., a hash, may be calculated. As the data is read from the buffer memory at 614 for writing to a new device, a second checksum may be created and compared at 616 with the first checksum to ensure the data was written correctly in the buffer. At 618, the data written to the new device may be read and compared byte-by-byte with the source buffer to insure that the data was written correctly to the new device.

The foregoing steps may be repeated to convert the original single file system blockset 502 into multiple blocksets corresponding to a separate virtual device and blockset for each RAID disk group. At 412, the metadata of the block headers for each block in the original legacy blockset 502 may be updated to the new offsets in the new virtual storage devices that are exposed at 414 by the RAID storage manager. At 416, the single device file system may be rebuilt as a multiple virtual device file system using the converted metadata in the blocks of the newly created blocksets to generate the metadata for the blockset header and descriptor table for each disk group. In the example shown in FIG. 5, the file system conversion process results in two virtual storage devices for two disk groups and corresponding blocksets 520, 522. In practice, however, it will be appreciated that there may be a plurality of new virtual storage devices and corresponding blocksets.

The advantages of the new multiple virtual storage device file system over the legacy single virtual device file system include the ability to separately and independently address virtual storage devices, and to add easily new shelves of disks as needed or to replace an existing shelf by migrating the data to free blocks on other shelves or to a new device and aligning the metadata without having to rebuild the file system.

While the foregoing has been with reference to particular embodiments of the invention, it will be appreciated that changes may made to these embodiments without departing from the principles and spirit of the invention, the scope of which is set out in the appended claims.

The invention claimed is:

1. A method of converting a first file system that abstracts a plurality of physical storage devices as a single first virtual device in a logical contiguous linear address space having one first blockset that includes a plurality of blocks, into a second file system that abstracts groups of said plurality of physical storage devices as multiple second virtual devices, comprising:

partitioning said first blockset at boundaries of said groups of said physical storage devices into a plurality of separate independent second blocksets, each second blockset having an independent logical address space and corresponding to one storage group of said physical storage devices;

migrating data from source blocks of said first blockset for each of said one storage groups of physical storage devices to target blocks of a corresponding second blockset of each of said one storage groups;

updating metadata in headers of target blocks of said second blocksets according to locations of said target blocks in said second blocksets; and rebuilding said first file system as said second file system by abstracting said storage groups of physical storage devices and their corresponding second blocksets as separate virtual storage devices.

2. The method of claim 1, wherein said partitioning comprises splitting said first blockset at disk storage group boundaries into multiple second blocksets such the each second blockset and disk storage group have a one-to-one mapping, and creating new second blockset metadata for the second blockset of each storage group so that the second file system can separately access each second blockset.

3. The method of claim 2, wherein said partitioning comprises creating a separate independent second blockset having its own separate address space for each storage group.

4. The method of claim 1, wherein said migrating comprises moving data using invulnerable data movement to ensure the integrity of said data, and wherein said partitioning comprises identifying allocated blocks of said first blockset at said boundaries of said storage groups; determining at each boundary a number of blocks necessary to provide a space required for second blockset metadata; and moving a necessary number of said allocated blocks to unallocated blocks in said first blockset to free said space required for said second blockset metadata.

5. The method of claim 4, wherein said invulnerable data movement comprises writing data and metadata read from said source blocks into a buffer memory, determining that the data written to said buffer memory is correct, writing the data from the buffer memory to said target blocks, and verifying the data written to the target blocks by comparing it to the data in said buffer memory.

6. The method of claim 5, wherein said verifying comprises a read verify after write operation that compares the data written to the target blocks with the data in said buffer memory.

7. The method of claim 5, wherein said writing data from source blocks comprises calculating a checksum of the data written into the buffer memory from each source block, and said determining comprises comparing said checksum with another checksum in said each source block.

8. The method of claim 1, wherein said updating metadata comprises updating a location in said metadata of each target block according to an offset of said target block in a corresponding second blockset.

9. The method of claim 8, wherein said rebuilding said first file system comprises generating blockset header and trailer metadata for each second blockset using said updated metadata of target blocks of said each second blockset.

10. The method of claim 1, wherein said groups of physical storage devices each comprise a RAID array of disks.

11. A method of converting a first file system that abstracts a plurality of physical storage devices as a single virtual device in a logical contiguous linear address space comprising one first blockset that includes a plurality of blocks into a second file system that abstracts said plurality of physical storage devices as multiple separate virtual devices, each separate virtual device having its own separate second blockset and logical address space, comprising:

identifying in said first blockset a boundary between first and second groups of said plurality of physical storage devices, which groups respectively comprise first and second storage groups;

determining an amount of space required for second blockset metadata of a new second blockset associated with said first storage group;

migrating data in allocated blocks at said boundary to unallocated blocks in said first blockset to free a number of blocks at said boundary that is necessary to provide said space required for said second blockset metadata;

updating block metadata in headers of blocks of said first blockset that contain data of said first storage group according to locations of said blocks in said second blockset; and rebuilding said first file system to convert the first file system to said second file system.

12. The method of claim 11 further comprising repeating said identifying, said determining, and said migrating multiple times to form multiple groups of physical storage devices corresponding to said multiple virtual devices, and wherein said second file system comprises a multiple virtual device file system.

13. The method of claim 11, wherein said migrating comprises moving data of said allocated blocks using invulnerable data movement.

14. The method of claim 13, wherein said invulnerable data movement comprises writing data and metadata read from said allocated blocks into a buffer memory, first verifying the data written to said buffer memory is correct, writing the data from buffer memory to an unallocated block in said first blockset, and second verifying the data written to the unallocated block by comparing it to the data in said buffer memory.

15. The method of claim 14, wherein said metadata read from said allocated blocks comprises a first checksum of the data in said allocated block, and said first verifying comprises computing a second checksum of the data written to said buffer from said allocated block, and comparing said first and second checksums.

16. The method of claim 11, wherein said updating comprises updating said block metadata according to offsets of said blocks within the second blockset.

17. The method of claim 11, wherein said rebuilding said first file system comprises generating blockset header and trailer metadata for said first and second blocksets from block metadata of the blocks in each blockset.

* * * * *